Figure 1:
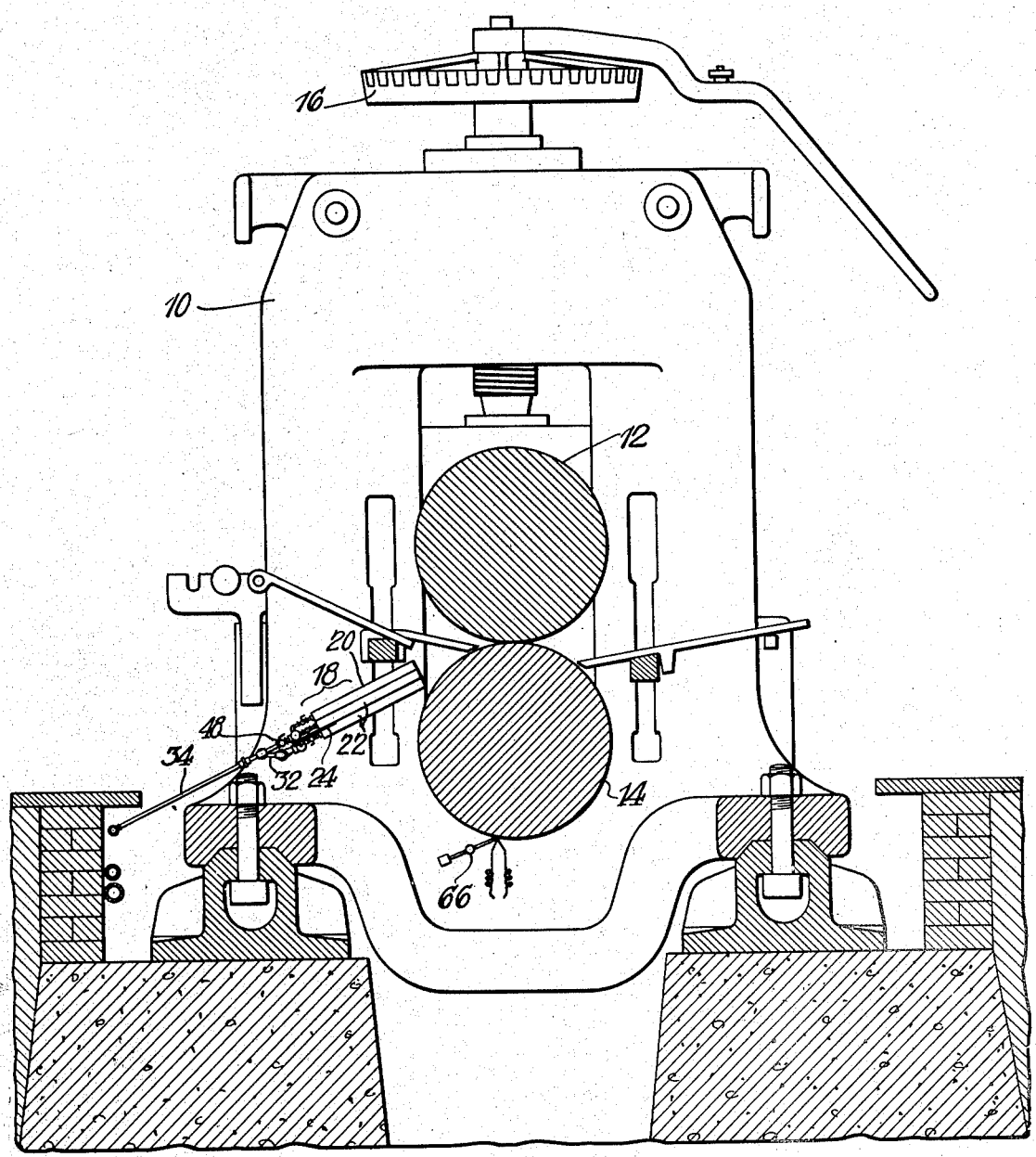

July 27, 1937.  J. S. IRVIN  2,088,241
TEMPERATURE CONTROL MEANS FOR ROLLING MILLS
Filed Jan. 3, 1935  4 Sheets-Sheet 1

INVENTOR.
Jay S. Irvin.
BY
ATTORNEYS

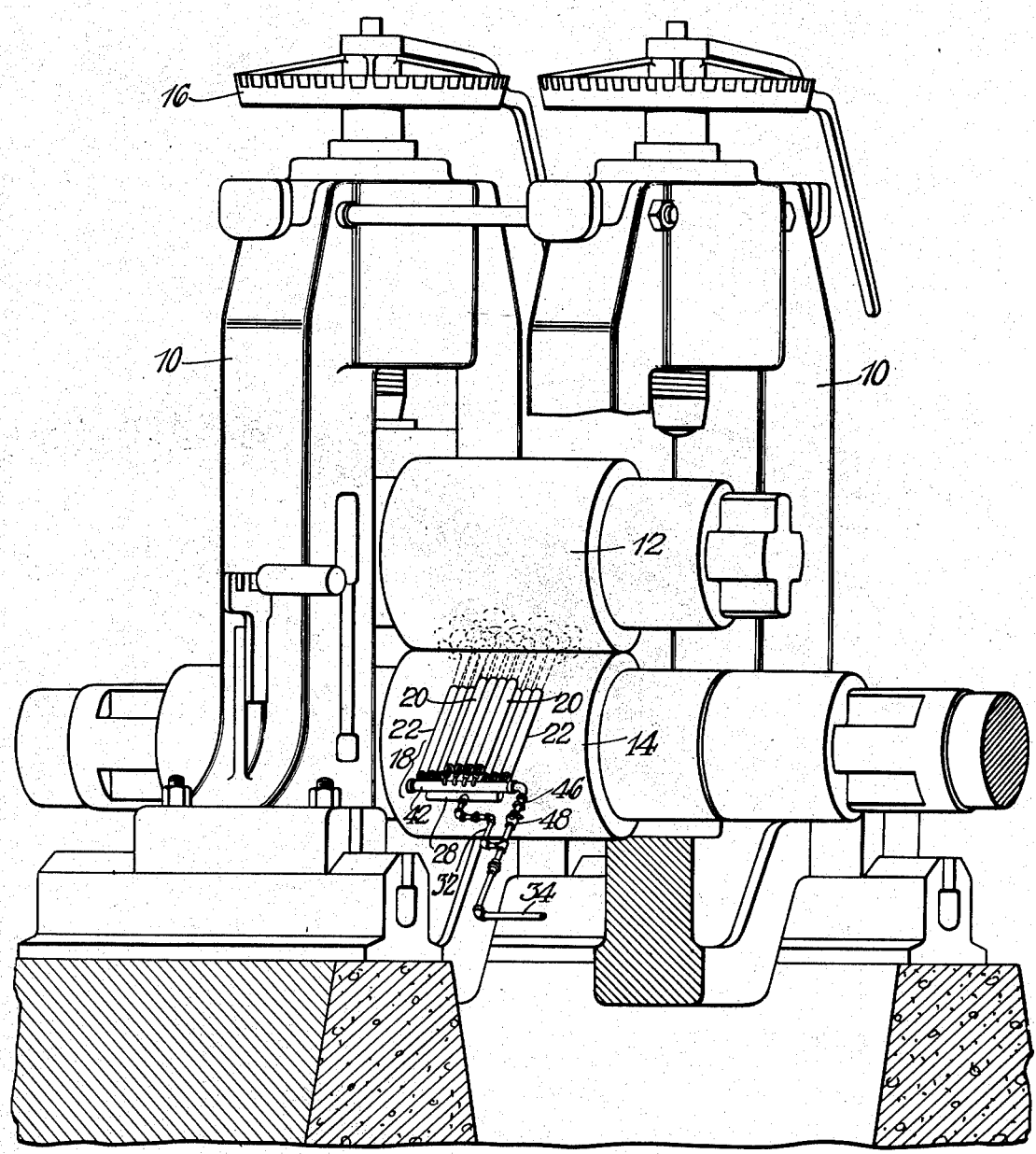

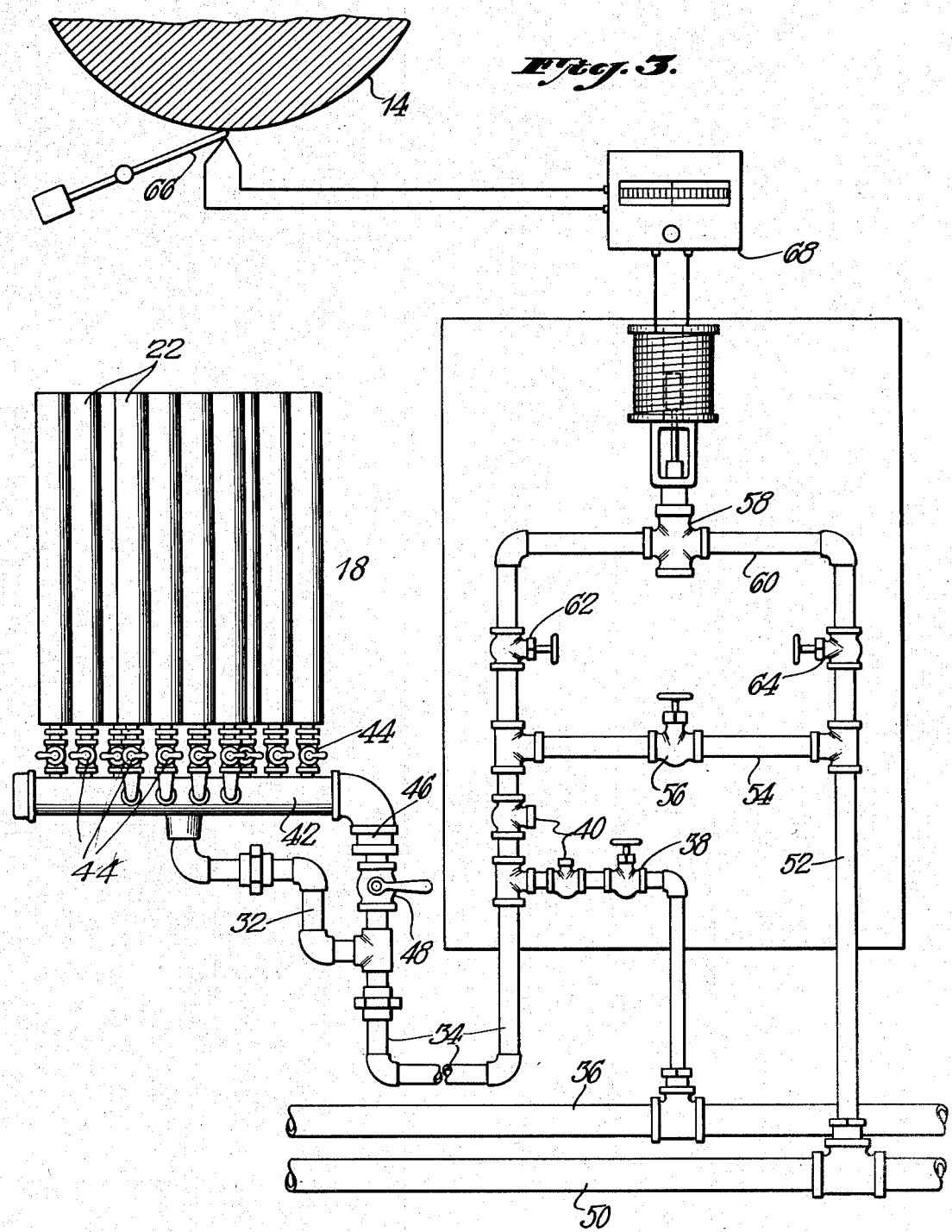

July 27, 1937.                    J. S. IRVIN                    2,088,241
                  TEMPERATURE CONTROL MEANS FOR ROLLING MILLS
                Filed Jan. 3, 1935            4 Sheets-Sheet 4
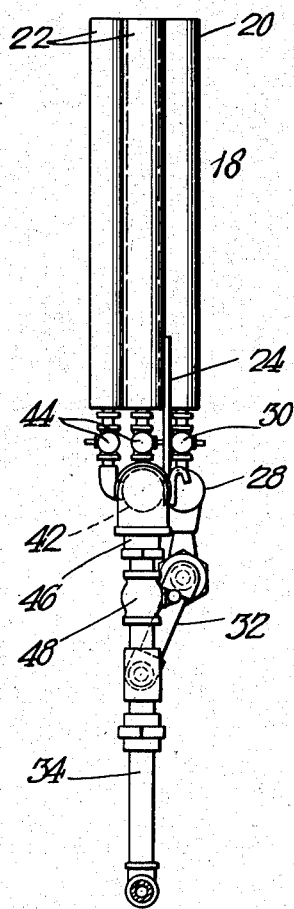
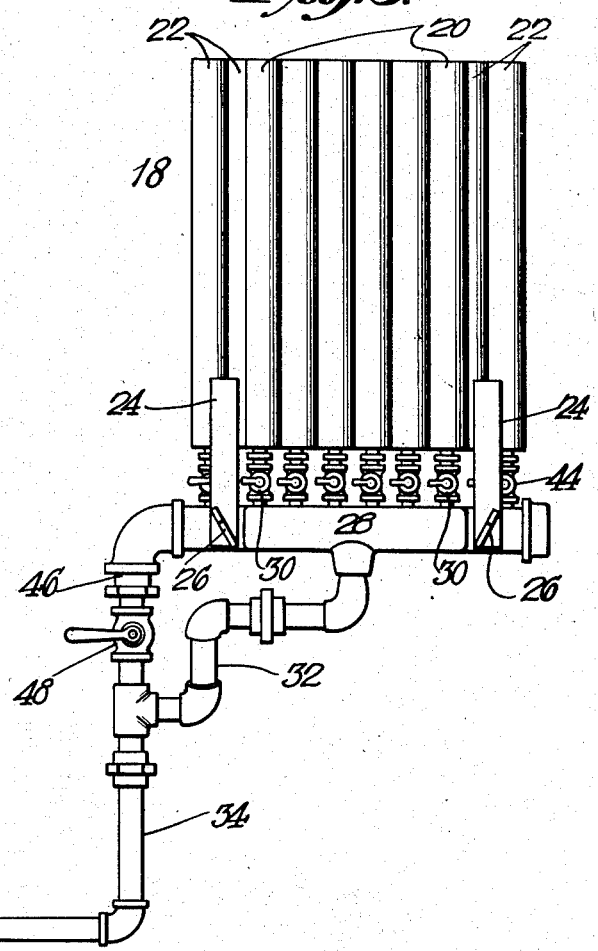
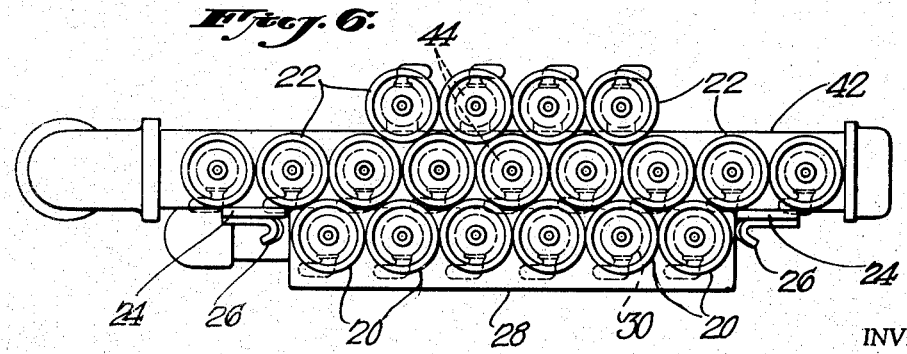
INVENTOR.
JAY S. IRVIN.
BY
ATTORNEYS Patented July 27, 1937

2,088,241

UNITED STATES PATENT OFFICE 2,088,241

TEMPERATURE CONTROL MEANS FOR ROLLING MILLS

Jay S. Irvin, Pittsburg, Calif.

Application January 3, 1935, Serial No. 286

2 Claims. (Cl. 80—41)

This invention relates to improved means for controlling the temperature of the rolls of rolling mills and while not limited thereto, it is particularly well suited for maintaining the rolls of a sheet rolling mill at the optimum rolling temperature.

The invention will be fully apparent from the following specification when read in connection with the accompanying drawings and will be defined with particularity, as required by the patent statutes, in the appended claims.

In the drawings—

Fig. 1 is a cross sectional view of a sheet or tin mill equipped with my improved temperature control apparatus; Fig. 2 is a perspective view of the mill; Fig. 3 is a somewhat diagrammatic view principally in plan of the piping layout, the heating and cooling devices and the controls therefor; Figs. 4 and 5 are detail views of the heating and cooling unit; Fig. 6 is an end view of the groups of heating and cooling pipes.

Normally in rolling light gauge sheets, the first step in the manufacturing process is performed on a mill or series of mills known as hot mills, as they obtain a high temperature to elongate the bars or sheets, the heat being derived in part from the heated stock as it comes from the furnace.

In conventional sheet or tin mill practice, the working period on the hot mills normally starts at midnight on Sunday and continues through the week until the following Saturday morning. During the day on Saturday, the mills are reconditioned in preparation for the following week, the rolls being changed and bearings being replaced, if necessary. The accumulated grease and general cleaning up of the entire unit is also taken care of during this idle Saturday period.

Prior to the actual rolling operations in starting up the mill, it is necessary for best operating conditions to preheat the rolls to a predetermined optimum rolling temperature. This preheating period generally starts several hours previous to actual rolling operation before the arrival of the operating crew and continues up to the time such crew takes over the operation of the mill.

The particular means employed for heating the rolls depends greatly upon the geographical location of the mill. For example, either electric or gas heated devices may be utilized. In the particular embodiment illustrated, however, a nicety of temperature control of the rolls is secured by a combination of devices, one of which is adapted to raise the temperature and the other of which is adapted to lower the temperature, gas being the heating medium employed and steam being the cooling medium employed.

During the normal working rolling period, when the bars or plate of high temperature are passing between the rolls, it is normally unnecessary to utilize the heating temperature to maintain the high temperature as there is sufficient heat supplied from the bar itself. However, it is deemed important to provide cooling means to prevent rolls reaching too high a degree of temperature. For this control, I provide means for applying a suitable cooling fluid, steam being employed in the particular embodiment of the invention herein illustrated.

In the operation of the mill, in the normal operating week, many conditions may arise which will affect the roll temperature, exerting an undesirable influence on the rolled product unless a readily variable roll temperature control means such as embodied in the present invention is available.

In the embodiment of the invention illustrated, 10—10 represent the usual roll housings of a two-high sheet or tin mill including upper and lower rolls 12 and 14 driven from any conventional source of power, the active pass being under the control of manually operated screw downs 16. Located on the catcher's side or on the rollers side, if desirable, of the mill, I provide a temperature control device indicated as a whole at 18. This includes a plurality of gas heater pipes 20 and steam pipes 22. The pipes are arranged in pipe organ fashion, and are held in assembled relationship in any suitable manner, although in practice I find it convenient to weld them to one another and to provide flat supporting bars 24 and hooks 26 to facilitate properly positioning the device so as to direct the jets of heating and cooling medium simultaneously to the two rolls, the device preferably being in the inclined position indicated in Fig. 1, wherein it is noted that either the flame or the cooling fluid can be discharged substantially between the nip of the rolls.

The gas heater pipes 20 connect to a gas manifold 28, there being a respective pet-cock 30 interposed between each gas burner pipe 20 and the gas manifold 28, so as to permit of individual adjustment. The gas manifold 28 is connected by a branch 32 to a supply pipe 34 which communicates through the connections shown in Fig. 3 to the gas supply main 36. These connections include a gas control valve 38 and check valves 40.

The pipes 22 for the steam or of other cooling fluid connect with a manifold 42, there being pet-cocks 44 interposed between said steam pipes 22 and the manifold to permit of individual adjustment of the supply to each of the pipes. The steam manifold 42 communicates by way of branch 46 and steam control valve 48 with the pipe 34 and through the connections shown in Fig. 3 with the steam main 50. Connected with this main, there is a branch pipe 52 connected by a by-pass 54 having therein a valve 56 controlling the flow of steam or other fluid to the pipe 34.

A solenoid valve 58 is located in a by-pass pipe 60 and is adapted to control the flow of steam to the pipe 34 in accordance with the setting of by-pass valves 56, 62 and 64. The solenoid valve is adapted to be automatically operated in accordance with variations in temperature of the roll. For this purpose, a known type of thermocouple, indicated at 66, is provided which is effective to control suitable electric circuits in response to which the solenoid valve is actuated and a conventional type of remote control indicator 68 is provided by means of which the operator can discern the temperature conditions of the rolls.

In the operation of my improved temperature control apparatus, the procedure in warming up the mills is to revolve the rolls of the mill train under its own power and apply the heat as follows.

The valve 48 of the heater is closed. This shuts off the top and middle group of pipes (Fig. 6) permitting the gas to pass out only through the lower six pipes of the burner. The valve 38 (usually located on a control board situated on the catcher's side of the mill) is opened and the flame is ignited by means of a taper or torch applied near the outlet end of the pipes 20. The selective control of heating is secured by a proper manipulation of the valves which is briefly as follows. For initially raising the temperature of the rolls by the use of a combustible mixture, the valves are manipulated as follows—first, close by-pass valves 62 and 64 in the steam line. Second, close valve 48 in the branch line 34. Third, open gas valve 38 and ignite the combustible mixture at the ends of the pipes 20 adjacent the nip of the rolls. Fourth, individually adjust the volume to suit conditions by manipulation of gas control pet-cocks 30 and manipulation of main gas control valve 38. The above operations will permit the burning of gas in the set of six gas pipes 20.

The selective control of cooling the rolls with steam when the same reach the desired temperature is effected as follows—first, close gas valve 38. Second, open the valve 48 in the branch line 34. Third, open the steam line by-pass valves 62 and 64. Fourth, adjust individually steam control pet-cocks 44 to suit conditions desired along the length of the roll and also adjust the valves 62 and 64. Fifth, keep valve 56 normally closed, this valve being only adapted to be opened in the event of failure of solenoid valve 58.

The flame, as indicated in Figs. 1 and 2, strikes in the nip between the top and bottom rolls spreading out and covering their entire width. The pet-cocks 30 permit of an individual adjustment. Otherwise, the gas volume is controlled by manipulation of the valve 38.

When the rolls are up to the required temperature and cooling is required, the gas valve 38 will be closed and the valve 48 will be opened. This will permit steam to pass through all of the pipes 20 and 22, the by-pass valves 62 and 64 being opened for this purpose.

From this period on, the cooling of the rolls is effected automatically under control of the thermo-couple 66 and the solenoid valve 58, the rolling temperature being indicated visually on the instrument 68, usually located on the control board, at each mill or at a remote point in the central office. From the foregoing, it is clear that once the rolls have been heated up to the proper temperature, the work being rolled will continue to supply additional heat to the rolls and the steam or other temperature control medium discharged will be effective to cool or lower the temperature of the rolls due to the variation of the volume of steam or other cooling fluid applied to the rolls, the volume of such steam or cooling fluid being varied in accordance with variations in temperature of the rolls themselves.

From the foregoing description, the advantages arising from the use of the invention should be readily apparent to those skilled in the art. Among these advantages, however, attention is directed to the following. By utilizing the device as a preheater, there is no time or heat lost in changing from a heater to a cooler as is frequently the case where individual heating and cooling units are employed.

As a mill is revolving during the entire preheating period, the heating medium is applied directly to the working portion of the body of the roll and thus diffuses the heat throughout the entire roll, such heat passing out through the roll necks in a substantially uniform manner which closely approximates actual rolling conditions. The apparatus permits the heating and cooling medium being directed or confined to any desired part or zone of the working surface of the roll and thus prevents the ends of the rolls from becoming too cold when rolling narrow bars or packs.

The heating operation is so controllable that in operation the heat can be applied until the first few pairs are rolled, whereupon the cooling medium can be applied to prevent too rapid heating of the rolls.

In case of delays in delivering stock to be rolled, the heating medium can be applied intermittently or immediately when the rolls start to revolve. Or, in rolling wide light weight orders, where it is difficult to keep the mill hot, the heating medium may be applied constantly.

By the proper manipulation of the pet-cocks, the zone of influence of the cooling medium may be controlled in such a way as to prevent a detrimental reduction of the roll neck temperatures. The device permits control of the temperature either for the full width of the mill or the application of a heating or cooling medium to an intermediate portion, for example, corresponding to the width of work being rolled.

If in operation the mill appears to be losing heat or becoming too cool, gas can be immediately applied to restore the desired temperature. The invention is a labor saver due to the fact that it is always in place, thus obviating the labor and time required to install and remove separate heating and cooling elements. The utilization of the gas heating device as distinguished from an electric heating device is deemed advantageous because the gas heater of the invention permits of heating the roll necks uniformly whereas heaters of the electric type seldom cover the entire body of the roll and are effective to produce only a confined heat zone, leaving the ends of the rolls relatively cold. Moreover, electric heaters are objectionable due to the likelihood of developing short circuits with a consequent burning or damaging of the rolls.

While the invention has been described with particular reference to the embodiment thereof herein illustrated, it is not to be construed that I am limited thereto since I contemplate such substitution of equivalents as may be made without invention and it is, therefore, intended that the claims shall be interpreted as broadly as is consistent with the teachings of the prior art.

What I claim is:—

1. A rolling mill having a temperature control device comprising a group of many gas burner pipes secured to one another in face to face relationship connected to a gas supply manifold, individual pet-cocks between said manifold and each of said pipes, a group of steam pipes connected with a steam manifold, respective pet-cocks between each of said steam pipes and said steam manifold, respective gas and steam supply mains, pipe connections between said mains and said manifolds, manually operated valves in said pipe connections selectively controlling the flow of steam and gas to said manifolds and supporting means including hooked members to facilitate positioning the device in proper juxtaposition to the rolls.

2. A rolling mill having a temperature control device comprising a multiplicity of elongated gas burner pipes whose side walls contact and are secured to one another, said pipes being connected to a gas supply manifold, a multiplicity of steam pipes similarly secured to one another in side to side relationship and connected with a steam manifold, respective gas and steam supply mains, pipe connections between said mains and said manifolds and valves in said pipe connections selectively controlling the flow of steam and gas to said manifolds.

JAY S. IRVIN.